(12) United States Patent
Gerstenberger et al.

(10) Patent No.: US 8,447,343 B2
(45) Date of Patent: May 21, 2013

(54) METHODS AND ARRANGEMENTS IN A MOBILE TELECOMMUNICATION NETWORK

(75) Inventors: Dirk Gerstenberger, Stockholm (SE); Daniel Larsson, Solna (SE); Lars Lindbom, Karlstad (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 461 days.

(21) Appl. No.: 12/893,383

(22) Filed: Sep. 29, 2010

(65) Prior Publication Data

US 2011/0081927 A1  Apr. 7, 2011

Related U.S. Application Data

(60) Provisional application No. 61/248,547, filed on Oct. 5, 2009.

(51) Int. Cl.
| | |
|---|---|
| H04B 7/14 | (2006.01) |
| H04B 7/00 | (2006.01) |
| H04B 7/185 | (2006.01) |
| H04W 4/00 | (2009.01) |
| G01R 31/08 | (2006.01) |

(52) U.S. Cl.
USPC ........... 455/522; 370/318; 370/328; 370/329; 370/248; 370/315

(58) Field of Classification Search
USPC ................. 455/522; 370/318, 328, 329, 248, 370/315
See application file for complete search history.

(56) References Cited

U.S. PATENT DOCUMENTS

| | | | |
|---|---|---|---|
| 6,349,094 B1* | 2/2002 | Vastano et al. | 370/328 |
| 7,236,474 B2* | 6/2007 | Seo et al. | 370/329 |
| 7,725,121 B2* | 5/2010 | Ishii et al. | 455/522 |
| 8,369,884 B2* | 2/2013 | Ishii et al. | 455/522 |
| 2003/0123396 A1* | 7/2003 | Seo et al. | 370/252 |
| 2009/0131069 A1* | 5/2009 | Wu et al. | 455/452.2 |
| 2010/0296459 A1* | 11/2010 | Miki et al. | 370/329 |
| 2011/0085491 A1* | 4/2011 | Tynderfeldt et al. | 370/315 |
| 2011/0170431 A1* | 7/2011 | Palanki et al. | 370/252 |
| 2012/0147836 A1* | 6/2012 | Ishii et al. | 370/329 |
| 2012/0218904 A1* | 8/2012 | Narasimha et al. | 370/248 |
| 2012/0230268 A1* | 9/2012 | Marinier et al. | 370/329 |
| 2012/0275395 A1* | 11/2012 | Gerstenberger et al. | 370/329 |
| 2013/0028216 A1* | 1/2013 | Baldemair et al. | 370/329 |
| 2013/0034069 A1* | 2/2013 | Uemura | 370/329 |

* cited by examiner

*Primary Examiner* — Bobbak Safaipour
(74) *Attorney, Agent, or Firm* — Potomac Patent Group, PLLC

(57) ABSTRACT

The present invention relates to methods and arrangements for assisting a User Equipment (UE) to determine transmit power to be used on a first uplink component carrier y, wherein the base station is configured to communicate with the UE over a plurality of uplink and downlink component carriers x,y. The UE is aware of path loss parameters associated with a second downlink component carrier x. The method in a base station comprises determining cell specific path loss parameters associated with the component carriers of the base station. The cell specific path loss parameters at least comprises path loss parameters associated with the first uplink component carrier y and a second uplink component carrier x which is paired to the second downlink component carrier x, wherein the second uplink component carrier and second downlink component carrier are within one frequency band. The method comprises the further steps of calculating a pathloss offset, deltaPL(y,x), for the first uplink component carrier y, wherein the pathloss offset deltaPL(y,x) is the pathloss power offset for the first uplink component carrier y with respect to the second uplink component carrier x, and sending the calculated pathloss offset, deltaPL(y,x) to the UE.

18 Claims, 9 Drawing Sheets

METHODS AND ARRANGEMENTS IN A MOBILE TELECOMMUNICATION NETWORK

TECHNICAL FIELD

The present invention relates to methods and arrangements in a wireless telecommunication network, and in particular to pathloss compensation in conjunction with carrier aggregation.

BACKGROUND

3GPP Long Term Evolution (LTE) is a project within the 3rd Generation Partnership Project (3GPP) to improve the UMTS standard with e.g. increased capacity and higher data rates towards the fourth generation of mobile telecommunication networks. Hence, the LTE specifications provide downlink peak rates up to 300 Mbps, an uplink of up to 75 Mbit/s and radio access network round-trip times of less than 10 ms. In addition, LTE supports scalable carrier bandwidths from 20 MHz down to 1.4 MHz and supports both FDD (Frequency Division Duplex) and TDD (Time Division Duplex).

LTE uses OFDM in the downlink and DFT-spread OFDM in the uplink. The basic LTE downlink physical resource can thus be seen as a time-frequency grid as illustrated in FIG. 1, where each resource element corresponds to one OFDM subcarrier during one OFDM symbol interval.

In the time domain, LTE downlink transmissions are organized into radio frames of 10 ms, each radio frame consisting of ten equally-sized subframes of length $T_{subframe}=1$ ms as illustrated in FIG. 2.

Furthermore, the resource allocation in LTE is typically described in terms of resource blocks, where a resource block corresponds to one slot (0.5 ms) in the time domain and 12 contiguous subcarriers in the frequency domain. Resource blocks are numbered in the frequency domain, starting with 0 from one end of the system bandwidth.

Downlink transmissions are dynamically scheduled, i.e., in each subframe the base station transmits control information about to which terminals data is transmitted and upon which resource blocks the data is transmitted, in the current downlink subframe. This control signaling is typically transmitted in the first 1, 2, 3 or 4 OFDM symbols in each subframe. A downlink system with 3 OFDM symbols as control is illustrated in FIG. 3.

LTE uses hybrid-ARQ, where, after receiving downlink data in a subframe, the terminal attempts to decode it and reports to the base station whether the decoding was successful (ACK) or not (NAK). In case of an unsuccessful decoding attempt, the base station can retransmit the erroneous data.

Uplink control signaling from the terminal to the base station consists of hybrid-ARQ acknowledgements for received downlink data; terminal reports related to the downlink channel conditions, used as assistance for the downlink scheduling; scheduling requests, indicating that a mobile terminal needs uplink resources for uplink data transmissions.

The uplink control data is either multiplexed with granted uplink user data transmissions, or transmitted via an uplink control channel if the UE has not received a grant for uplink scheduled data transmission.

A fundamental requirement for any cellular system is the possibility for the UE to request a connection setup, commonly referred to as random access. Typically, the random access carried out via a contention based random access channel (RACH). In LTE, the RACH is used to achieve uplink time synchronization in different scenarios, where initial access to the cellular system represents one scenario. (Uplink time synchronization is vital for obtaining orthogonal transmissions and is an LTE system requirement for granting any uplink transmission of data.)

The LTE random-access procedure consists of four steps in which the RACH is used in the first step, as illustrated in FIG. 4, for the transmission of a random access preamble. The preamble transmission indicates to the base station the presence of a random access attempt and allows the base station to estimate the propagation delay between the eNodeB and the UE. In the second step, the eNodeB responds by sending a message on the downlink shared channel (DL-SCH) that includes e.g. required uplink timing adjustments and a grant for uplink scheduled transmission of higher layer messages on the uplink shared channel (UL-SCH). In the third step, the UE transmits its random access message, via UL-SCH, which could e.g. be a connection request or an uplink scheduling request if the UE is already connected. This message also includes the identity of the UE. In the fourth step, the eNodeB transmits the contention resolution message containing the UE identity received in the third step.

The time-frequency resource upon which the random access preamble is transmitted is known as the physical RACH (PRACH). Transmission of PRACH is only possible in certain subframes, which are known to the UE through broadcasted system information. The bandwidth of the PRACH transmission is always 6 resource blocks whereas its time duration depends on configured preamble format. FIG. 5 illustrates a PRACH configuration with one PRACH allocation per radio frame and with 1 ms PRACH duration.

The power control used for the transmission of a random access preamble on the PRACH is based on an open loop procedure, i.e. there is no feedback from the eNodeB. Typically the UE bases its initial PRACH power settings on estimated downlink pathloss and the eNodeB preamble received target power available to the UE as part of the broadcasted system information.

Since the random access preamble transmission is a non-scheduled transmission, it is not possible for the eNodeB to employ a closed loop correction to correct for measurement errors in the open loop estimate. Instead, a power ramping approach is used where the UE will increase its transmission power (or rather its received target power) between transmission attempts of the random access preamble. This ensures that even a UE with a too low initial transmission power, due to e.g. error in the pathloss estimate, after a number of preamble transmission attempts will have increased its power sufficiently to be able to be detected by the eNodeB. For example, after N random access attempts, the total ramp-up of the transmission power is $$\Delta P_{rampup} = (N-1) * \Delta_{ramp\ step}$$

where $\Delta_{ramp\ step}$ is the power ramping step size between each transmission attempt. It is desired to keep the number of random access attempts N to a reasonable low number in order to avoid high probability of random access collisions with other terminals as well as to avoid large access delays.

In order to increase the downlink and uplink peak-data rates in LTE systems, it has been decided for LTE Release 10 to increase the maximum transmission bandwidth from 20 MHz up to 100 MHz. This bandwidth expansion is achieved by aggregating multiple component carriers, where each component carrier has a maximum bandwidth of 20 MHz. Multiple downlink, or uplink, component carries can either be adjacent or non-adjacent. Carrier aggregation thus allows for simultaneous transmissions/receptions on different non-contiguous spectrum fragments.

SUMMARY

The open loop power control setting for prior art FDD LTE terminals utilizes that paired uplink and downlink transmission bands are not separated by very large guard bands (e.g. large in terms of magnitudes of several 100 MHz). This means that pathloss estimation can be done on downlink signals, although the power setting is for an uplink transmission.

The open loop power setting for uplink transmissions in case of carrier aggregation where component carrier pairs are far away from each other in frequency, e.g. residing in different bands as 900 MHz and 2100 MHz, would be incorrect if the UE makes its open loop power estimate on one downlink component carrier in the 900 MHz band, and then transmits PRACH or PUSCH/PUCCH/SRS on the uplink component carrier in the 2100 MHz band. It is therefore desired to achieve an improved pathloss estimation.

This is achieved according to embodiments of the present invention by a set of pathloss power offsets which are signaled to mobile terminals also referred to as User Equipments, which can be either dedicated signaling or broadcast, e.g. via system information broadcasted in a cell. Each power offset compensates for a certain coupling between an uplink component carrier on a first frequency band, associated with a downlink component carrier on where the measurements are performed, and an uplink component carrier on a second frequency band which will be used for transmission.

This prevents a large amount of random access attempts or incorrect initial uplink power setting for PUSCH/PUCCH/SRS, and in this way the UE compensates for significant pathloss differences between downlink and uplink due to large duplex distances, e.g. in dual band component carrier deployments.

According to a first aspect of embodiments of the present invention a method in a base station for assisting a UE to determine transmit power to be used on a first uplink component carrier y is provided. The base station is configured to communicate with the UE over a plurality of uplink and downlink component carriers x,y, and the UE is aware of path loss parameters associated with a second downlink component carrier x. In the method, cell specific path loss parameters associated with the component carriers of the base station are determined, wherein the cell specific path loss parameters at least comprises path loss parameters associated with the first uplink component carrier y and a second uplink component carrier x. The second uplink component carrier x is paired to the second downlink component carrier x, and wherein the second uplink component carrier and second downlink component carrier are within one frequency band. A pathloss offset, deltaPL(y,x), is calculated for the first uplink component carrier y, wherein the pathloss offset deltaPL(y,x) is the pathloss power offset for the first uplink component carrier y with respect to the second uplink component carrier x, and the calculated pathloss offset, deltaPL(y,x) is sent to the UE.

According to a second aspect of embodiments of the present invention a method in a UE to determine UE transmit power to be used on a first uplink component carrier y is provided. The UE is configured to communicate with a base station over a plurality of uplink and downlink component carriers x,y. In the method, path loss parameters of a second downlink component carrier x is determined, a pathloss offset, deltaPL(y,x) is received wherein the deltaPL(y,x) is the pathloss power offset for the first uplink component carrier y with respect to a second uplink component carrier x. The second uplink component carrier x is paired to the second downlink component carrier x, wherein the second uplink component carrier and second downlink component carrier are within one frequency band. Further, the received pathloss offset deltaPL(x,y) and the determined path loss parameters of the second downlink component carrier x are used for calculating the transmit power to be used on the first uplink component carrier y.

According to a third aspect of embodiments of the present invention a base station for assisting a UE to determine transmit power to be used on a first uplink component carrier y, is provided. The base station is configured to communicate with the UE over a plurality of uplink and downlink component carriers x,y, and the UE is aware of path loss parameters associated with a second downlink component carrier x. The base station comprises a processor configured to determine cell specific path loss parameters associated with the component carriers of the base station, wherein the cell specific path loss parameters at least comprises path loss parameters associated with the first uplink component carrier and a second uplink component carrier x. The second uplink component carrier x is paired to the second downlink component carrier x, wherein the second uplink component carrier and second downlink component carrier are within one frequency band. The processor is further configured to calculate a pathloss offset, deltaPL(y,x), for the first uplink component carrier y, wherein the pathloss offset deltaPL(y,x) (803) is the pathloss power offset for the first uplink component carrier y with respect to the second uplink component carrier x. Moreover, the base station comprises a transmitter configured to send the calculated pathloss offset, deltaPL(y,x) to the UE.

According to a fourth aspect of embodiments of the present invention a UE for determining UE transmit power to be used on a first uplink component carrier y is provided. The UE is configured to communicate with a base station over a plurality of uplink and downlink component carriers x,y. The UE comprises a processor configured to determine path loss parameters of a second downlink component carrier x and a receiver configured to receive a pathloss offset, deltaPL(y,x), wherein the deltaPL(y,x) is the pathloss power offset for the first uplink component carrier y with respect to a second uplink component carrier x. The second uplink component carrier is paired to the second downlink component carrier x and wherein the second uplink component carrier and second downlink component carrier are within one frequency band. The processor (804) is further configured to use the received pathloss offset deltaPL(x,y) and the determined path loss parameters of the second downlink component carrier x for calculating the transmit power to be used on the uplink component carrier y.

An advantage with embodiments of the present invention is that they provide means to improve the open loop power setting for uplink transmissions in case of carrier aggregation where component carriers are far away from each other in frequency, e.g. residing in different bands as 900 MHz and 2100 MHz.

The embodiments also reduce both the probability for random access collisions and the average time for accessing the network.

DETAILED DESCRIPTION

Figure 1:
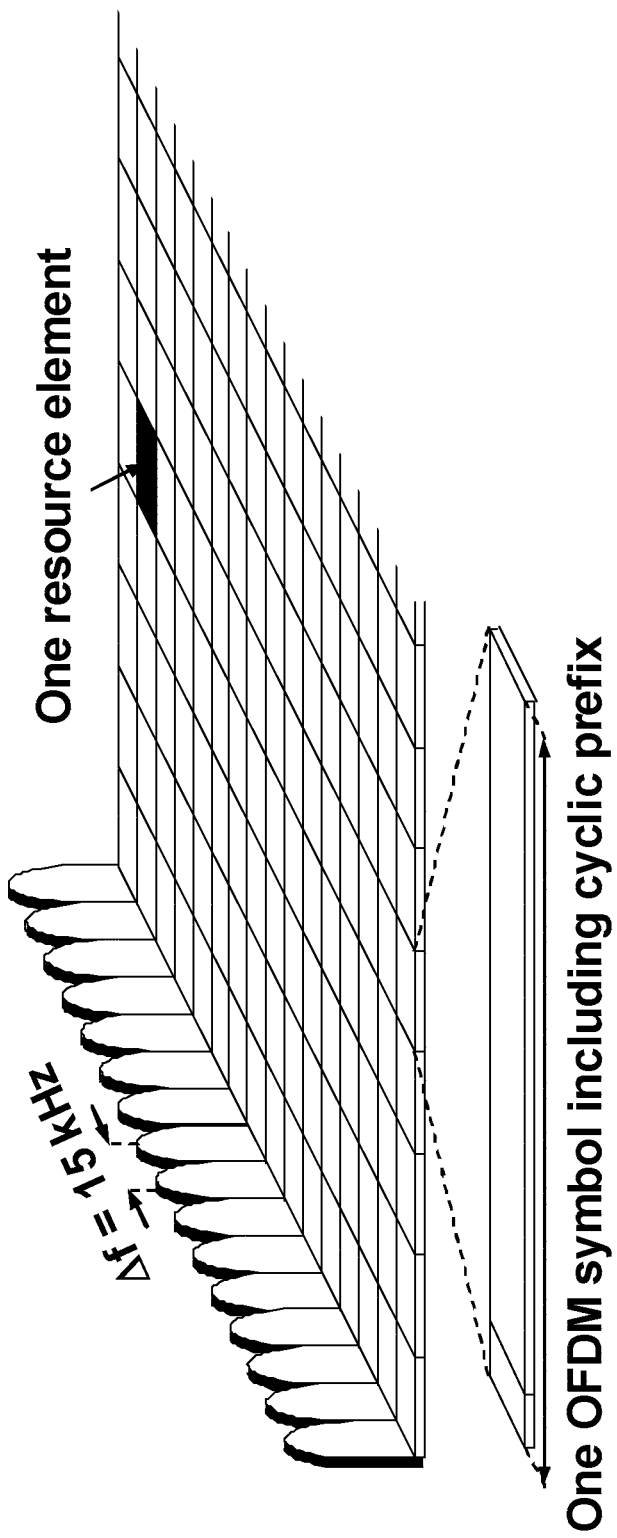
FIG. 1 illustrates the LTE downlink physical resources according to prior art.
Figure 2:
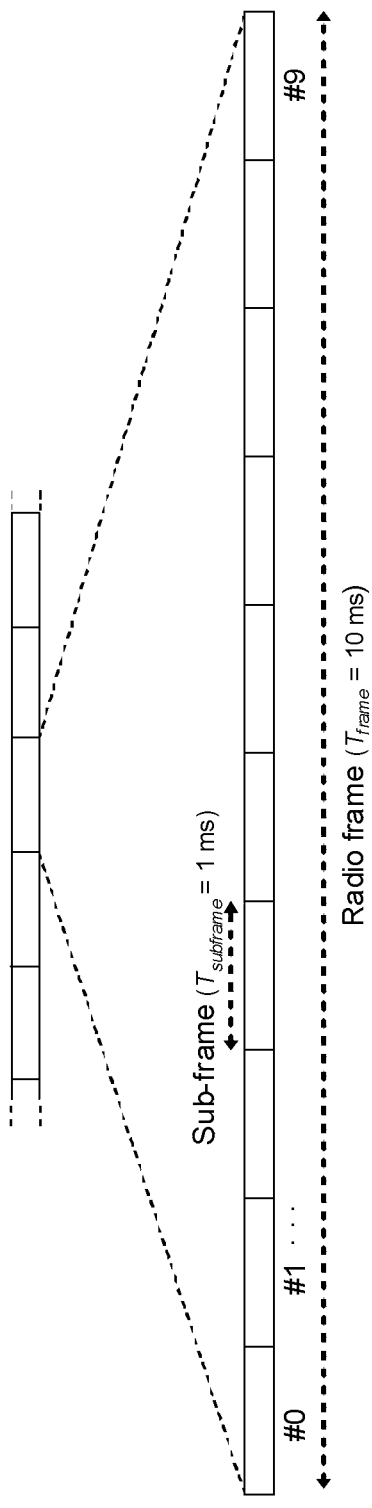
FIG. 2 illustrates the LTE time-domain structure according to prior art.
Figure 3:
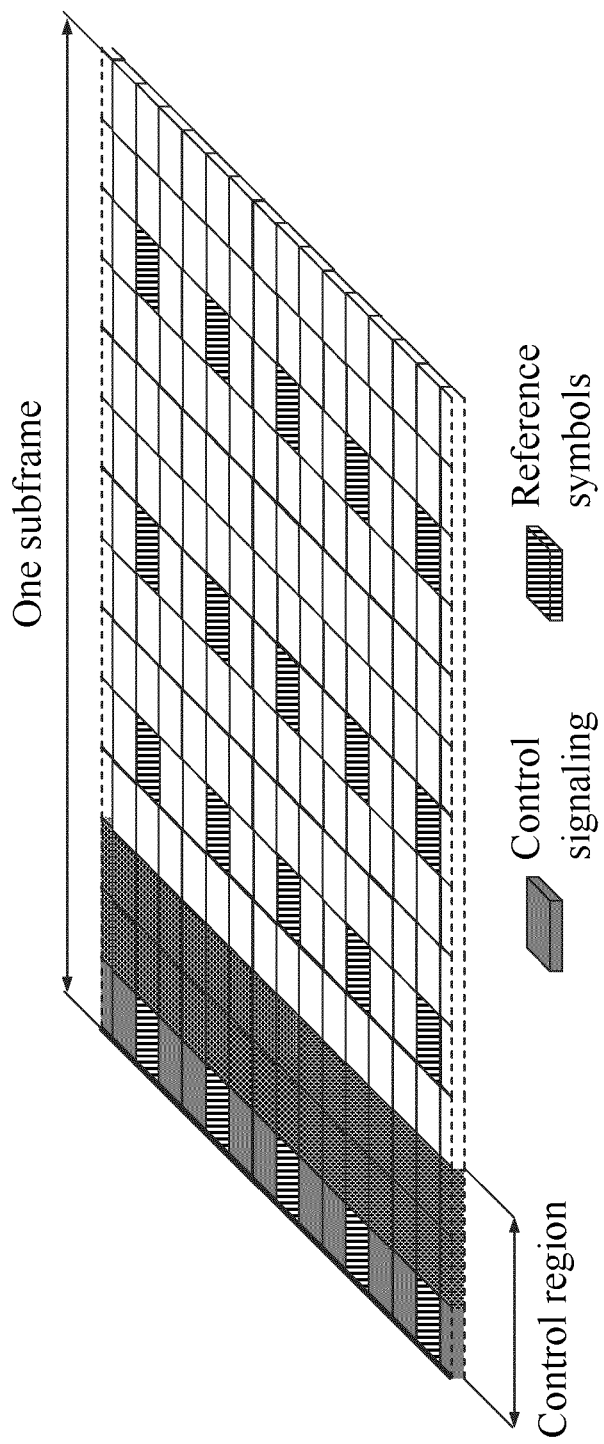
FIG. 3 illustrates the downlink sub frames according to prior art.
Figure 4:
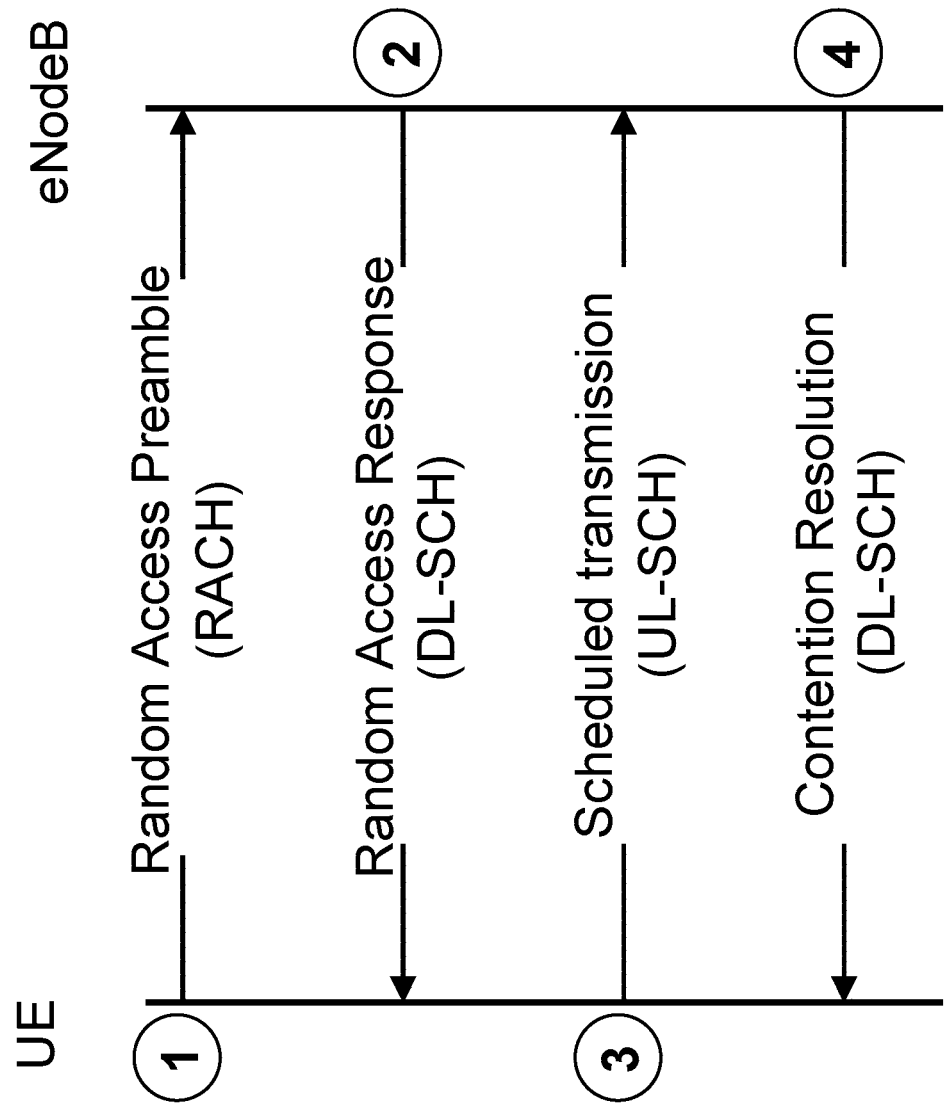
FIG. 4 illustrates the Random access procedure in LTE according to prior art.
Figure 5:
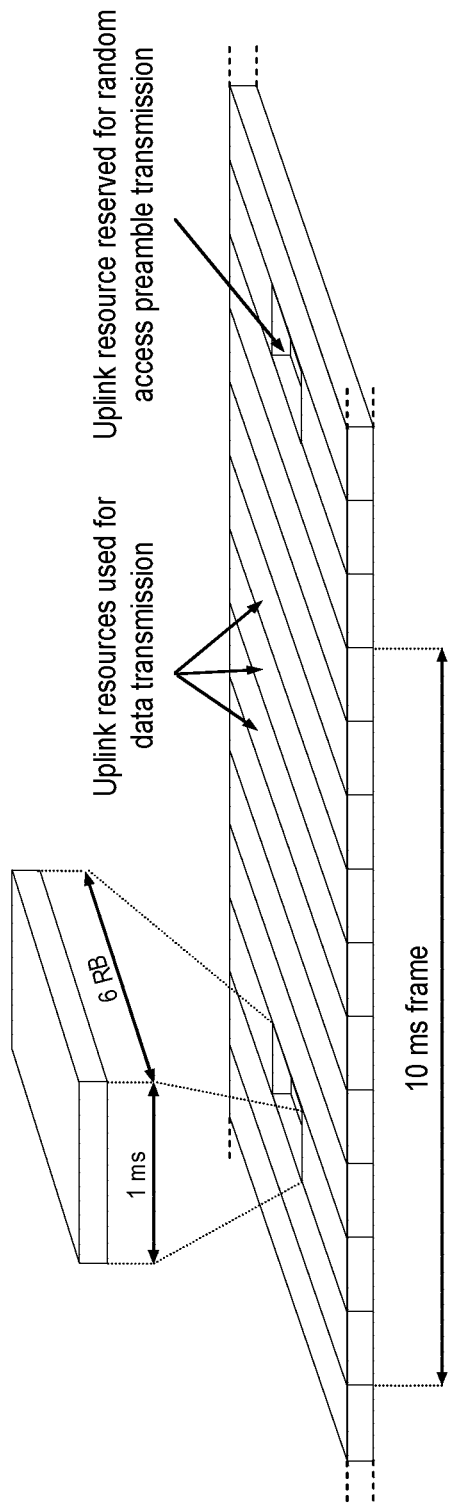
FIG. 5 illustrates the principal of PRACH preamble transmission in FDD according to prior art.

The embodiments of the present invention will be described in the context of an LTE advanced network, but it should be noted that the invention is applicable in any system having aggregated component carriers.

In order to prevent a large amount of random access attempts or incorrect initial uplink power setting for physical channels like PUSCH and PUCCH the UE is configured to compensate for significant pathloss differences between downlink and uplink due to large duplex distances, e.g. in dual band component carrier deployments according to the first and second embodiments as described below. I.e. a compensation parameter referred to as deltaPL is introduced to compensate for significant pathloss differences between uplink component carriers in different frequency bands. Thus the UE estimates the pathloss PL(x) on a second downlink component carrier x and then applies the compensation parameter deltaPL to the PL(x) such that the UE can calculate available power for transmissions on a first uplink component carrier y. The second downlink component carrier x is paired to a second uplink component carrier x on the same frequency band and a first downlink component carrier y is paired to the first uplink component carrier y.

The deltaPL(y,x) is according to a first embodiment determined as the pathloss power offset corresponding to the first uplink component carrier y and the second uplink component carrier x, where path loss measurements have been performed on the second downlink component carrier x associated with the second uplink component carrier x. The second component carrier x may be any component carrier of a set of uplink component carriers on different frequency bands and the first component carrier y may be any component carrier of a set of downlink component carriers on different frequency bands.

Furthermore according to a second embodiment the second downlink component carrier x is an anchor downlink component carrier. The anchor downlink component carrier may also be referred to as primary component carrier or primary cell.

In order to calculate the compensation parameter deltaPL, also referred to as pathloss offset, cell specific path loss parameters associated with the component carriers of the base station are determined. The cell specific path loss parameters at least comprises path loss parameters associated with the first uplink component carrier y and the second uplink component carrier x. Based on these cell specific path loss parameters, a pathloss offset, referred to as deltaPL(y,x), is calculated for the first uplink component carrier y, wherein the pathloss offset deltaPL(y,x) is the pathloss power offset for the first uplink component carrier y with respect to the second uplink component carrier x. Examples of cell specific path loss parameters are cell specific pathloss coefficients that relate to the propagation conditions in a specific cell for a specific frequency and statistics for a given cell that have been collected by the network, e.g. collecting RSRP (Reference Signal Received Power) measurements from the UEs in that cell. By using the RSRP, the network can calculate the downlink pathloss, since it knows its own transmit power. It should be noted that two frequencies means two cells, so there is only one frequency to one cell in 3GPP terminology.

Figure 9:
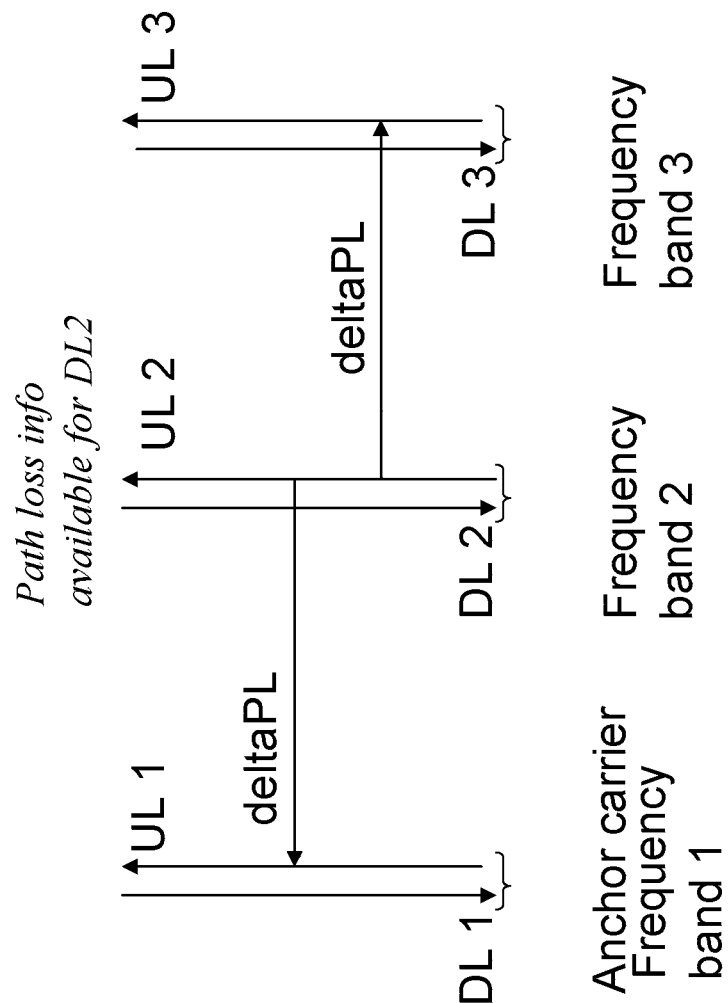
FIGS. 9 and 10 illustrate schematically the principles of embodiments of the present invention.
Figure 10:
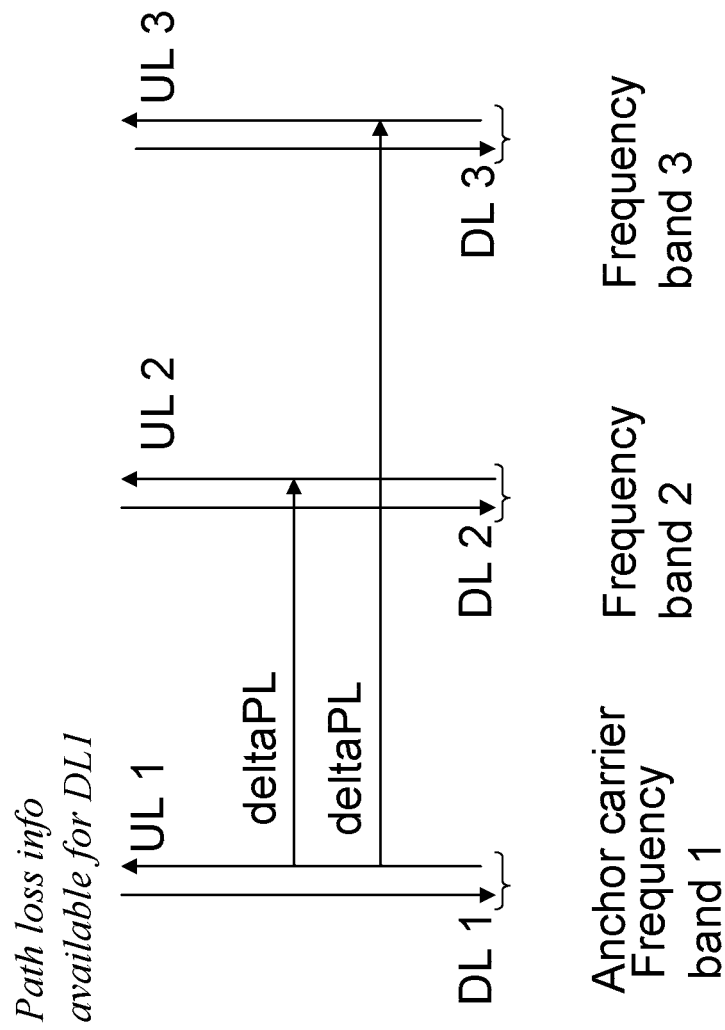

This is illustrated in FIGS. 9 and 10 where uplink and downlink component carriers on three frequency bands, frequency bands 1, 2 and 3 are illustrated.

FIG. 9 shows the first embodiment, where the pathloss measurements are performed on DL2 and the deltaPL is determined between UL 2 and UL 1 and between UL 2 and UL 3 if UL 1 and UL 3 will be used for uplink transmission. It should be noted that no deltaPL has to be determined if UL 2 will be used for uplink transmission, since the measurements are performed on the corresponding downlink component carrier DL2. In this example, the anchor carrier is on frequency band 1, but which one of the frequency bands being the anchor carrier is not relevant for this embodiment.

FIG. 10 shows the second embodiment, where the pathloss measurements are performed on the anchor carrier which is DL1 in FIG. 10 and the deltaPL is determined between UL 1 and UL 2 and between UL 1 and UL 3 if UL 2 and UL 3 will be used for uplink transmission. It should be noted that no deltaPL has to be determined if UL 1 will be used for uplink transmission, since the measurements are performed on the corresponding downlink component carrier DL1.

In the embodiments, a pathloss power offset referred to as deltaPL is signaled to the UE. DeltaPL is a set of parameters signaled to the UE either dedicated or via broadcast. The size of the set of parameters is determined by the number of downlink and uplink component carriers configured in a cell. E.g., there can be two uplink component carriers (n∈{0, 1}) and one downlink component carrier (m=0).

The pathloss power offset deltaPL can be used for determining uplink transmission power on different channels which is further described below.

The setting of the preamble transmission power P_PRACH (n) for transmission of the PRACH on uplink carrier n with a pathloss estimate on downlink component carrier m is determined as:

$$P\_PRACH(n) = \min\{P\_cmax, PREAMBLE\_RECEIVED\_TARGET\_POWER(n) + PL(m) + deltaPL(m,n)\}\_[dBm],$$

where P_cmax is the configured UE transmitted power defined in 3GPP TS 36.101 and PL(m) is the downlink pathloss estimate calculated in the UE with respect to downlink component carrier m. PREAMBLE_RECEIVED_TARGET_ POWER(n) is a higher layer parameter defined in 3GPP TS 36.101, with respect to uplink component carrier n.

The setting of the UE Transmit power $P_{PUSCH}$ for the physical uplink shared channel (PUSCH) transmission in subframe i is defined by $$P_{PUSCH}(i) = \min\{P_{CMAX}, 10\log_{10}(M_{PUSCH}(i)) + P_{O\_PUSCH}(j) + \alpha(j) \cdot (PL(m) + deltaPL(m,n)) + \Delta_{TF}(i) + f(i)\}[dBm]$$

where deltaPL(m,n) is the pathloss power offset for uplink component carrier n with respect to the uplink component carrier m associated with downlink pathloss estimate on downlink component carrier m, and the remaining parameters are defined as:

The setting of the UE Transmit power $P_{PUCCH}$ for the physical uplink control channel (PUCCH) transmission in subframe i is defined by $$P_{PUCCH}(i) = \min\{P_{CMAX}, P_{0\_PUCCH} + PL(m) + deltaPL(m, n) + h(n_{CQI}, n_{HARQ}) + \Delta_{F\_PUCCH}(F) + g(i)\}[dBm]$$

where deltaPL(m,n) is the pathloss power offset for uplink component carrier n with respect to the uplink component carrier m associated with the downlink pathloss estimate on downlink component carrier m, and the remaining parameters are defined as $P_{CMAX}$ is the configured UE transmitted power The parameter $\Delta_{F\_PUCCH}(F)$ is provided by higher layers. Each $\Delta_{F\_PUCCH}(F)$ value corresponds to a PUCCH format (F) relative to PUCCH format 1a.

h(n) is a PUCCH format dependent value, where $n_{CQI}$ corresponds to the number information bits for the channel quality information and $n_{HARQ}$ is the number of HARQ bits.

$P_{O\_PUCCH}$ is a parameter composed of the sum of a cell specific parameter $P_{O\_NOMINAL\_PUCCH}$ provided by higher layers and a UE specific component $P_{O\_UE\_PUCCH}$ provided by higher layers.

Further details of the parameters can be found in 3GPP TS 36.213.

It should be noted that the embodiments of the present invention are also applicable to the setting of the UE transmit power $P_{SRS}$ for sounding reference symbols (SRS).

The setting of the UE Transmit power $P_{SRS}$ for the Sounding Reference Symbol transmitted on subframe i is defined by $$P_{SRS}(i) = \min\{P_{CMAX}, P_{SRS\_OFFSET} + 10\log_{10}(M_{SRS}) + P_{O\_PUSCH}(j) + \alpha(j) \cdot (PL(m) + deltaPL(m, n) + f(i)\}[dBm]$$

where deltaPL(m,n) is the pathloss power offset for uplink component carrier n with respect to the uplink component carrier m associated with the downlink pathloss estimate on downlink component carrier m, and $P_{CMAX}$ is the configured UE transmitted power, for $K_S=1.25$, $P_{SRS\_OFFSET}$ is a 4-bit UE specific parameter semi-statically configured by higher layers with 1 dB step size in the range [−3, 12] dB. For $K_S=0$, $P_{SRS\_OFFSET}$ is a 4-bit UE specific parameter semi-statically configured by higher layers with 1.5 dB step size in the range [−10.5, 12] dB, where $K_S$ is given by the UE specific parameter deltaMCS-Enabled provided by higher layers.

$M_{SRS}$ is the bandwidth of the SRS transmission in subframe i expressed in number of resource blocks.

f(i) is the current power control adjustment state for the PUSCH.

$P_{O\_PUSCH}(j)$ and $\alpha(j)$ are parameters as defined 3GPP TS 36.213 where j=1.

Consequently, the first uplink component carrier y, also referred to as uplink component carrier n, may be used to carry one of PUCCH, PUSCH, SRS, and PRACH.

In the second embodiment, the downlink component carrier m, on which pathloss measurements have been performed is an anchor downlink component carrier. An anchor downlink component carrier is the downlink component carrier used primarily by the UE, to be used for e.g. pathloss estimation.

Figure 7:
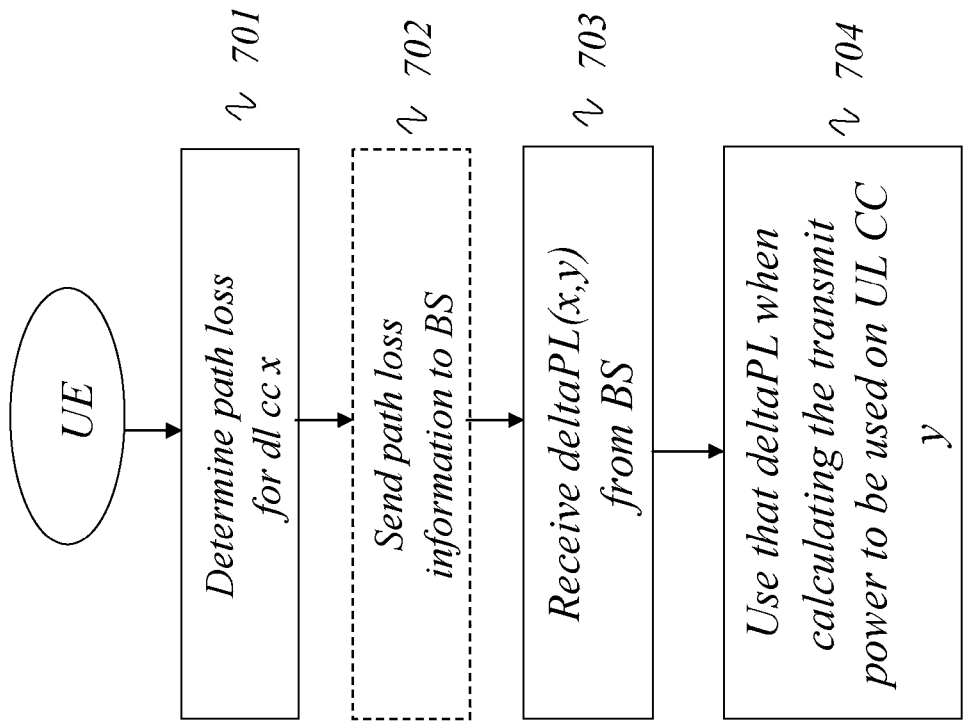
FIGS. 6 and 7 are flowcharts of the methods according to embodiments of the present invention.
Figure 6:
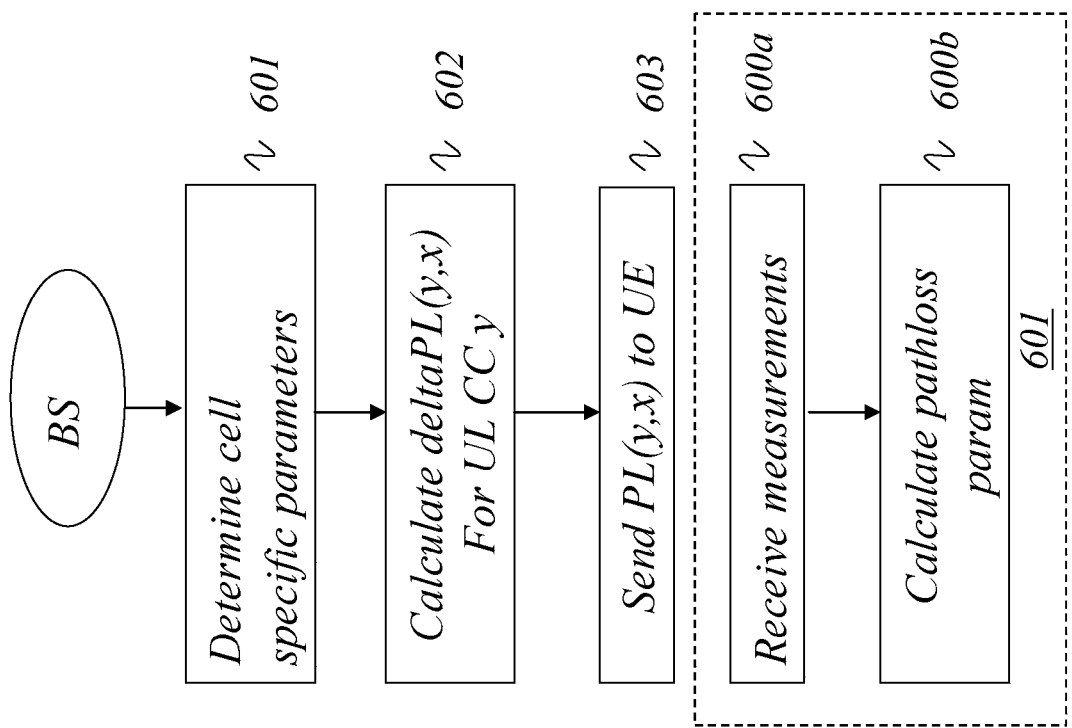

Turning now to FIGS. 6 and 7, illustrating the methods according to embodiments of the present invention.

In the flowchart of FIG. 6, the method in a base station for assisting a UE to determine transmit power to be used on a first uplink component carrier y is disclosed. The base station is configured to communicate with the UE over a plurality of uplink and downlink component carriers x,y, and the UE is aware of path loss parameters associated with a second downlink component carrier x. In a first step 601, cell specific path loss parameters associated with the component carriers of the base station are determined. The cell specific path loss parameters at least comprises path loss parameters associated with the first uplink component carrier and a second uplink component carrier x which is paired to the second downlink component carrier x of the same frequency band. These cell specific path loss parameters may be identified by the base station itself or configured in the base station by an operation and maintenance node. In a subsequent step 602 a pathloss offset, deltaPL(y,x), is calculated for the first uplink component carrier y, wherein the pathloss offset deltaPL(y,x) is the pathloss power offset for the first uplink component carrier y with respect to the second uplink component carrier x. Then the calculated pathloss offset, deltaPL(y,x) is sent 603 to the UE.

According to the second embodiment, the second downlink component carrier x is an anchor downlink component carrier.

In order for the base station to determine the cell specific path loss parameters, the method may comprise the further steps of receiving 600a measurements from the UE, and determining 600b cell specific path loss parameters associated with the first and second component carriers based on the received measurements. The measurements may be RSRP measurements.

According the flowchart of FIG. 7, a method in a UE to determine UE transmit power to be used on a first uplink component carrier y is provided. The UE is configured to communicate with a base station over a plurality of uplink and downlink component carriers x,y. In a first step the UE determines path loss parameters of a second downlink component carrier x and receives 703 a pathloss offset referred to as deltaPL(y,x). The deltaPL(y,x) is the pathloss power offset for the uplink component carrier y with respect to an uplink component carrier x which is paired to the downlink component carrier x of the same frequency band. Then the UE uses 704 the received pathloss offset deltaPL(x,y) and the determined path loss parameters of the second downlink component carrier x for calculating the transmit power to be used on the uplink component carrier y.

According to an embodiment, the method comprises an optional step of sending 702 measurements such as RSRP measurements, to the base station to be used for determining path loss parameters.

Figure 8:
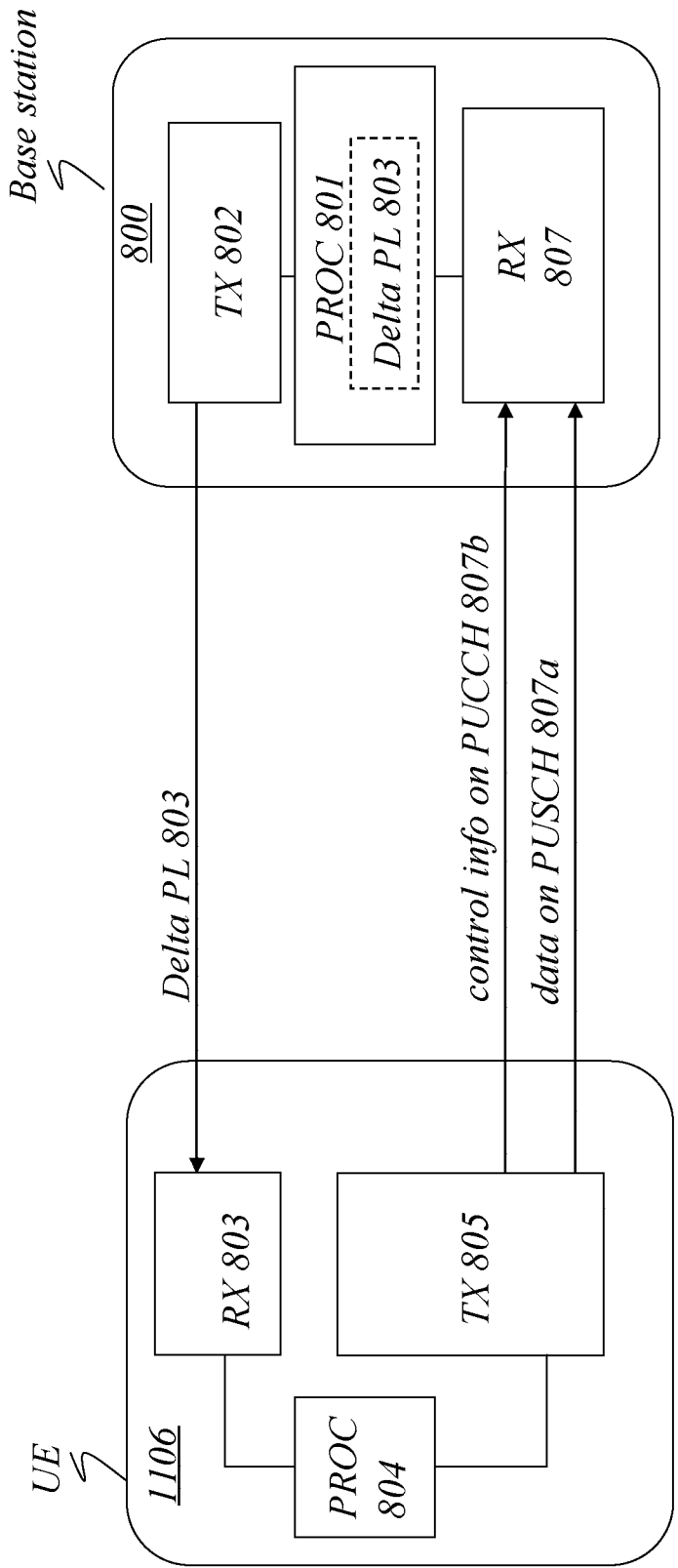
FIG. 8 illustrates the UE and the eNB according to embodiments of the present invention.

The embodiments of the present invention are also directed to a base station, also referred to as a eNB in LTE and to a UE. The UE is configured to wirelessly communicate with a mobile telecommunication network via base stations. Hence, the UE and the base station comprise antennas, power amplifiers and other software means and electronic circuitry enabling the wireless communication. FIG. 8 illustrates schematically a UE 1106 and a base station 800 according to embodiments of the present invention.

The base station 800 is configured to communicate with a UE 1106 over a plurality of uplink and downlink component carriers x,y and to determine transmit power to be used on a first uplink component carrier y. Further, the UE 1106 is aware of path loss parameters associated with a second downlink component carrier x. The base station 800 comprises a processor 801 configured to determine cell specific path loss parameters associated with the component carriers of the base station. The cell specific path loss parameters comprises at least path loss parameters associated with the first uplink component carrier and a second uplink component carrier x which is paired to the second downlink component carrier x of the same frequency band, to calculate a pathloss offset, deltaPL(y,x), 803 for the first uplink component carrier y. The pathloss offset deltaPL(y,x) 803 is the pathloss power offset for the first uplink component carrier y with respect to the second uplink component carrier x. The base station 800 further comprises a transmitter 802 configured to send the calculated pathloss offset, deltaPL(y,x) 803 to the UE 1106.

According to further embodiments, the base station further comprises a receiver 807 configured to receive measurements 807b from the UE, and wherein the processor 801 is further configured to determine path loss parameters associated with the first and second component carriers based on the received measurements. The receiver 807 is also configure to receive other control information 807b and data 807a on the different uplink component carriers for which the transmit power to be used is determined.

The UE 1106 is configured to determine UE transmit power to be used on a first uplink component carrier y, wherein and to communicate with a base station over a plurality of uplink and downlink component carriers x,y. The UE 1106 comprises a processor 804 configured to determine path loss parameters of a second downlink component carrier x and a receiver 803 configured to receive a pathloss offset, deltaPL(y,x). The deltaPL(y,x) is the pathloss power offset for the uplink component carrier y with respect to an uplink component carrier x which is paired to the downlink component carrier x of the same frequency band. The processor 804 is further configured to use the received pathloss offset delta-PL(x,y) and the determined path loss parameters of the second downlink component carrier x for calculating the transmit power to be used on the uplink component carrier y.

According to a further embodiment, the UE 1106 further comprises a transmitter 805 configured to send RSRP measurements to the base station 800 to be used for determining path loss parameters.

It should be noted that the transmitter 805 is also configured to transmit other control information 807b and data 807a on the different uplink component carriers for which the transmit power to be used is determined.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method in a base station for assisting a User Equipment, UE, to determine transmit power to be used on a first uplink component carrier y, wherein the base station is configured to communicate with the UE over a plurality of uplink and downlink component carriers x,y, and the UE is aware of path loss parameters associated with a second downlink component carrier x, the method comprising:
   determining cell specific path loss parameters associated with the component carriers of the base station, wherein the cell specific path loss parameters at least comprises path loss parameters associated with the first uplink component carrier y and a second uplink component carrier x which is paired to the second downlink component carrier x, wherein the second uplink component carrier and second downlink component carrier are within one frequency band,
   calculating a pathloss offset, deltaPL(y,x), for the first uplink component carrier y, wherein the pathloss offset deltaPL(y,x) is the pathloss power offset for the first uplink component carrier y with respect to the second uplink component carrier x, and
   sending the calculated pathloss offset, deltaPL(y,x) to the UE.

2. The method according to claim 1, wherein the second downlink component carrier x is an anchor downlink component carrier.

3. The method according to claim 1, wherein the method further comprising:
   receiving measurements from the UE, and
   determining path loss parameters associated with the first and second component carriers based on the received measurements.

4. The method according to claim 3, wherein the received measurements are Reference Signal Received Power measurements.

5. The method according to claim 1, wherein the first uplink component carrier y is used for one of Physical Uplink Control Channel, PUCCH, Physical Uplink Shared Channel, PUSCH, Sounding Reference Signals, SRS, and Physical Random Access Channel, PRACH.

6. A method in a User Equipment, UE to determine UE transmit power to be used on a first uplink component carrier y, wherein the UE is configured to communicate with a base station over a plurality of uplink and downlink component carriers x,y, the method comprising:
   determining path loss parameters of a second downlink component carrier x,
   receiving a pathloss offset, deltaPL(y,x), wherein the deltaPL(y,x) is the pathloss power offset for the first uplink component carrier y with respect to a second uplink component carrier x which is paired to the second downlink component carrier x, wherein the second uplink component carrier and second downlink component carrier are within one frequency band, and
   using the received pathloss offset deltaPL(x,y) and the determined path loss parameters of the second downlink component carrier x for calculating the transmit power to be used on the first uplink component carrier y.

7. The method according to claim 6, wherein the method further comprising sending measurements to the base station to be used for determining path loss parameters.

8. The method according to claim 7, wherein the received measurements are Reference Signal Received Power measurements.

9. The method according to claim 6, wherein the second downlink component carrier x is an anchor downlink component carrier.

10. The method according to claim 6, wherein the first uplink component carrier y is used for one of Physical Uplink Control Channel, PUCCH, Physical Uplink Shared Channel, PUSCH, Sounding Reference Signals, SRS, and Physical Random Access Channel, PRACH.

11. A base station for assisting a User Equipment, UE, to determine transmit power to be used on a first uplink component carrier y, wherein the base station is configured to communicate with the UE over a plurality of uplink and downlink component carriers x,y, and the UE is aware of path loss parameters associated with a second downlink component carrier x, wherein the base station comprises a processor configured to determine cell specific path loss parameters associated with the component carriers of the base station, wherein the cell specific path loss parameters at least comprises path loss parameters associated with the first uplink component carrier and a second uplink component carrier x which is paired to the second downlink component carrier x, wherein the second uplink component carrier and second downlink component carrier are within one frequency band, to calculate a pathloss offset, deltaPL(y,x), for the first uplink component carrier y, wherein the pathloss offset deltaPL(y,x) is the pathloss power offset for the first uplink component carrier y with respect to the second uplink component carrier x, and a transmitter configured to send the calculated pathloss offset, deltaPL(y,x) to the UE.

12. The base station according to claim 11, wherein the second downlink component carrier x is an anchor downlink component carrier.

13. The base station according to claim 11, wherein the base station further comprises a receiver configured to receive measurements from the UE, and wherein the processor is further configured to determine path loss parameters associated with the first and second component carriers based on the received measurements.

14. The base station according to claim 11, wherein the first uplink component carrier y is used for one of Physical Uplink Control Channel, PUCCH, Physical Uplink Shared Channel, PUSCH, Sounding Reference Signals, SRS, and Physical Random Access Channel, PRACH.

15. A User Equipment, UE for determining UE transmit power to be used on a first uplink component carrier y, wherein the UE is configured to communicate with a base station over a plurality of uplink and downlink component carriers x,y, the UE comprises a processor configured to determine path loss parameters of a second downlink component carrier x, a receiver configured to receive a pathloss offset, deltaPL(y,x), wherein the deltaPL(y,x) is the pathloss power offset for the first uplink component carrier y with respect to a second uplink component carrier x which is paired to the second downlink component carrier x, wherein the second uplink component carrier and second downlink component carrier are within one frequency band, and the processor is further configured to use the received pathloss offset deltaPL(x,y) and the determined path loss parameters of the second downlink component carrier x for calculating the transmit power to be used on the uplink component carrier y.

16. The UE according to claim 15, wherein the UE further comprises a transmitter configured to send RSRP measurements to the base station to be used for determining path loss parameters.

17. The UE according to claim 15, wherein the second downlink component carrier x is an anchor downlink component carrier.

18. The UE according to claim 15, wherein the first uplink component carrier y is used for one of Physical Uplink Control Channel, PUCCH, Physical Uplink Shared Channel, PUSCH, Sounding Reference Signals, SRS, and Physical Random Access Channel, PRACH.

* * * * *